United States Patent
Rückert

(10) Patent No.: US 10,781,500 B2
(45) Date of Patent: Sep. 22, 2020

(54) GRANULES CONTAINING AGGLOMERATED BULK MATERIAL

(71) Applicant: Rheinkalk GmbH, Wülfrath (DE)

(72) Inventor: Wolfgang Rückert, Nistertal (DE)

(73) Assignee: Rheinkalk GmbH, Wülfrath (DE)

( * ) Notice: Subject to any disclaimer, the term of this patent is extended or adjusted under 35 U.S.C. 154(b) by 0 days.

(21) Appl. No.: 15/998,700

(22) Filed: Aug. 16, 2018

(65) Prior Publication Data

US 2018/0363078 A1   Dec. 20, 2018

Related U.S. Application Data

(63) Continuation of application No. 14/346,244, filed as application No. PCT/EP2012/068505 on Sep. 20, 2012, now abandoned.

(30) Foreign Application Priority Data

Sep. 21, 2011   (EP) ..................................... 11182167

(51) Int. Cl.
| | |
|---|---|
| *C21C 7/076* | (2006.01) |
| *C04B 18/02* | (2006.01) |
| *C04B 35/043* | (2006.01) |
| *C04B 35/057* | (2006.01) |
| *C04B 35/06* | (2006.01) |
| *C04B 35/63* | (2006.01) |
| *C04B 35/626* | (2006.01) |
| *C04B 103/00* | (2006.01) |

(52) U.S. Cl.
CPC ............ *C21C 7/076* (2013.01); *C04B 18/021* (2013.01); *C04B 35/043* (2013.01); *C04B 35/057* (2013.01); *C04B 35/06* (2013.01); *C04B 35/626* (2013.01); *C04B 35/6303* (2013.01); *C04B 2103/0067* (2013.01); *C04B 2235/3201* (2013.01); *C04B 2235/3208* (2013.01); *C04B 2235/3217* (2013.01); *C04B 2235/3272* (2013.01); *C04B 2235/3409* (2013.01);

(Continued)

(58) Field of Classification Search
CPC ....... C21C 7/076; C22B 9/006; C04B 18/021; C04B 35/043; C04B 35/057; C04B 36/06; C04B 35/626
See application file for complete search history.

(56) References Cited

U.S. PATENT DOCUMENTS

| | | | |
|---|---|---|---|
| 3,413,164 | A | 11/1968 | Hilding |
| 3,716,352 | A | 2/1973 | Ooi et al. |

(Continued)

FOREIGN PATENT DOCUMENTS

| | | |
|---|---|---|
| CA | 1064685 | 10/1979 |
| CA | 1140816 | 2/1983 |

(Continued)

OTHER PUBLICATIONS

Heaney, D. F. "3-Powders for Metal Injection Molding (MIM)." Handbook of Metal Injection Molding. Woodhead Publishing Series in Metals and Surface Engineering. pp. 50-63. https://doi.org/10.1533/9780857096234.1.50 (Year: 2012).*

(Continued)

*Primary Examiner* — Tima M. McGuthry-Banks
(74) *Attorney, Agent, or Firm* — Honigman LLP; Thomas A. Wootton, Esq.; Jonathan O. O'Brien

(57) ABSTRACT

The invention relates to granules composed of agglomerated reactive bulk material and a binder matrix, the binder matrix comprising as binder an organic or inorganic salt.

11 Claims, 1 Drawing Sheet

(52) U.S. Cl.
CPC .. *C04B 2235/443* (2013.01); *C04B 2235/445* (2013.01); *C04B 2235/5436* (2013.01)

(56) References Cited

U.S. PATENT DOCUMENTS

| | | | |
|---|---|---|---|
| 4,039,320 | A | 8/1977 | Uemura |
| 4,462,823 | A | 7/1984 | Fontaine et al. |
| 5,021,086 | A | 6/1991 | Luydkx et al. |
| 7,632,335 | B2 | 12/2009 | Iwasaki et al. |
| 8,404,259 | B2 | 3/2013 | Welshimer et al. |
| 2002/0004099 | A1 | 1/2002 | Ando |
| 2003/0051786 | A1 | 3/2003 | Verity |
| 2006/0150772 | A1 | 7/2006 | Iwasaki et al. |
| 2009/0270303 | A1 | 10/2009 | Sunder et al. |
| 2010/0048445 | A1 | 2/2010 | Gerusz et al. |

FOREIGN PATENT DOCUMENTS

| | | | |
|---|---|---|---|
| CN | 201024183 | | 2/2008 |
| CN | 101429041 | | 5/2009 |
| DE | 690126 | | 4/1940 |
| DE | 1193774 | | 5/1965 |
| DE | 1955869 | | 6/1970 |
| DE | 2010572 | | 3/1971 |
| DE | 1583969 | | 5/1972 |
| DE | 2115630 | | 10/1972 |
| DE | 2163203 | | 12/1972 |
| DE | 2255234 | | 5/1973 |
| DE | 2213605 | | 7/1973 |
| DE | 2431845 | | 9/1975 |
| DE | 69706918 | T2 | 10/2001 |
| DE | 102004033945 | | 2/2006 |
| DE | 102009061053 | | 6/2011 |
| EP | 0814134 | | 9/2001 |
| EP | 1659190 | | 5/2006 |
| EP | 1540023 | B1 | 4/2008 |
| FR | 2905954 | | 3/2008 |
| GB | 1112331 | | 5/1968 |
| GB | 1218805 | | 1/1971 |
| GB | 1288272 | | 9/1972 |
| GB | 1305466 | | 1/1973 |
| GB | 1382870 | | 2/1975 |
| GB | 1450385 | | 9/1976 |
| JP | H0627003 | B2 * | 4/1994 |
| WO | 9720784 | | 6/1997 |
| WO | 2004071993 | A1 | 8/2004 |
| WO | 2008013510 | A2 | 1/2008 |

OTHER PUBLICATIONS

JP H0627003 B2 machine translation (Year: 1994).*
Barbalace, Kenneth, USDOT Hazardous Materials Table 49 CRF 172.101—Class 4 Flammable Solids, Environmental.Chemistry. com, 1995-2017, Accessed on-line Nov. 20, 2017 https://EnvironmentalChemistry.com/yogi/hazmat/placards/class4-chemicals.html (Year: 1995)
"Calcium Cyanamide," EPA, Environmental Protection Agency, https://comptox.epa.gov/dashboard/dsstoxdb/results?utf8+CYANAMIDE (Year: 2015).
"Dolomite Powder," Minerals and Ores, Powder, Reade, www.reade.com/products/dolomite-powder, http://www.reade.com/products/dolomite-powder (Year: 2016).
Gerusz, Roman. Patent Family list for WO 2008034995 A(1) dated Mar. 27, 2008.
Gurlt, A., Die Bereitung der Steinkohlen-Briquettes, Universitats- und Landesbibliothek Munster, Braunschweig, 1880, pp. 1-59. This document relates to briquetting of black coal, & describes literature in relation to this topic relevant in 1880, the raw material for briquetting, the properties of black coal in the Ruhr area, the processing of black coal, the drying of washed coal, the properties of good black coal briquettes, possible organic & inorganic binders such as coal pitch & magnesia cement, mixing apparatus, pressing machines, the mfg costs when using coal pitch.
Haynes, W.M. (ed., CRC Handbook of Chemistry and Physics, 97th Edition (Internet Version 2017), CRC Press/Taylor & Francis, Boca Raton, FL. Properties of aluminum, iron fluroide, sodium fluoride, and cryolite.
Haynes, W.M., "Physical Constants of Inorganic Compounds", HBCP NetBase. Ed. CRC Handbook of Chemistry and Physics, 2016. Web. Jun. 24, 2016, Various pages.
Heinze, Gerald; Handbuch der Agglomerationstechnik, 2000, Wiley-VCH Verlag GmbH, p. 31.
Hirsch, Ulrich; Metallurgischen Reststoffen, Paper No. 12.0, Feb. 11-12, 2004.
Johar et al., "Microstructure characterization of Al/calcined Dolomite metal matrix composites", ICOSM, pp. 124-248, 2007.
Lueger, Otto; Lexikon der gesamten Technik and ihrer Hilfswissenschaften, Bd. 2 Stuttgart, Leipzig 1905, S. 299-306 Paper, pp. 1-14 (http:/www.zeno.org/nid/20005981409).
"Magnesium Cyanamide," EPA, Environmental Protection Agency, https://comptox.epa.gov/dashboard/dsstoxdb/results?utf8=%E2%9C%93&seach=magnesium+cyanamide (year 2015).
Obst, Karl-Heinz et al; The Influence of Lime and Synthetic Lime Products on Steel Production, J of the South African Institute of Mining and Metallurge, Jan. 1972, pp. 158-164.
Pauli, Anette; Herstellung von Retardmatrixpellets durch Schmelzagglomerierung in der Wirbelschicht, Inaugural Dissertation, zur Erlangung des Doktorgrades der Mathematisch-Naturwissenschaftiichen Fakultat derHeinrich-Heine-Universitat Dussldorf, 2005 (and Jul. 9, 2017 Web Pages printed on Oct. 25, 2017).
Pietsch, Wolfgang; Agglomeration Processes, Phenomena, Technologies, Equipment, Wiley-VCH Verlag GmbH, p. 45, 2002.
"polyethylene (PE)", Encyclopaedia Britannica. Britannica Academic. Encyclopaedia Britannica Inc., 2016. Web. Jun. 24, 2016.
Rumble, John R. "Physical and Optical Properties of Minerals," CRC Handbook of Chemistry and Physics, 98th ed., Taylor & Francis, www.crcpress.com, Calcium oxide and Ma (Year. 1996).
Sivrikaya, Osman et al; Use of Organic Binders and Borates in Pelletizing of Iron Oxides, IV International Boron Symposium, 15-17, Oct. 2009.
"Sodium Cyanamide," EPA, Environmental Protection Agency, https://comptox.epa.gov/dashboard/dsstoxdb/results?utf8=%E2%9C%93&searcyh=sodium%2Bcyanamide (Year: 2015).
"Starch Soluble (9005-84-9)." MSDS Melting Point Boiling Point Density Storage Transport. Chemical Book, Dec. 12, 2012.
Vecchione, Glen, "A Test for Marble", 100 Amazing First-Prize Science Fair Projects, New York: Sterling, 2005, p. 87.
Vervaet, Chris et al; Melt Granulation, found in the Handbook of Pharmaceutical Granulation Technology, 3rd Ed, vol. 198, Informa Healthcare USA, Inc., 2010, edited by Dilip M. Parikh at pp. 435-448.
Wünschendorfer Dolomitwerk GmbH, "Burnt Dolomite for Metallurgy", Sep. 1, 2009, retrieved from the internet at http://dolomitwerk-wuenschendorf.de/fileadmin/user_upload/englisch/Gebr._Dolomit_E_09-11-11.pdf on Apr. 10, 2014.
International Search Report for PCT/EP2012/068505 dated Dec. 19, 2012.
Carlson, Elmer T., The System: CaO—B2O3 Bureau of Standards Journal of Research, pp. 825-832, Washington, Oct. 10, 1932.
Heinze, Gerald; Handbook of Agglomeration Tecnnique (Handbuch der Agglomerationstechnik), 2000, Wiley-VCH Verlag GmbH, p. 31.
Hirsch, Ulrich; Briquetting Metailorgicat Waste for Recycling in the Material Cycle (Metallurgischen Reststoffen), Paper No. 12.0, Feb. 11-12, 2004.
Malyaeva, T.A. et al., Influence of Boron on the Quality of Iron Ore Pellets, Trade Journal Metally, No. 1. 1996.
Sivrikaya, Osman, et at , Use of Boron Compounds as Binders in Iron Ore Pelletization, The Open Mineral Processing Journal, 2010, 3, 25-35.

* cited by examiner

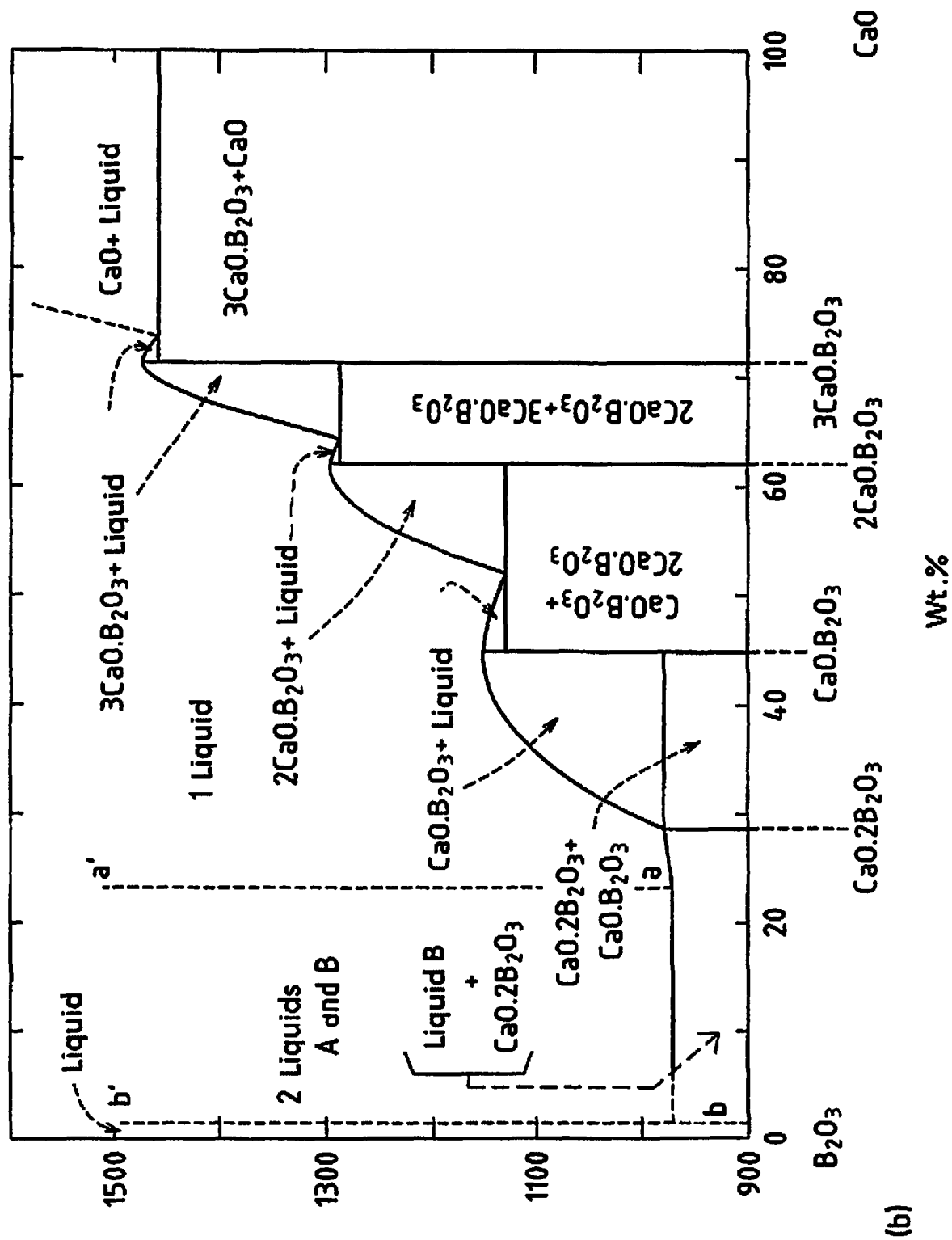
(b)

GRANULES CONTAINING AGGLOMERATED BULK MATERIAL

CROSS REFERENCE TO RELATED APPLICATIONS

This application is a Continuation Application of U.S. patent application Ser. No. 14/346,244, filed Dec. 5, 2014, which claims priority under 35 U.S.C. § 371 to Patent Cooperation Treaty Application No. PCT/EP2012/068505, filed Sep. 20, 2012, which claims the benefit of earlier filed European Application No. 11182167.4, filed Sep. 21, 2011, now Patent EP2573058 issued Dec. 21, 2016.

The invention relates to granules containing at least one agglomerated bulk material and a binder matrix. The invention also relates to a method for producing such granules and their use as an input material in the steel and refractory industry.

Production of granules from bulk material by means of agglomeration is essentially known. Through agglomeration the individual particles of the bulk material can be enlarged whereby the particle size distribution is shifted into a coarser size range.

A common granulation method is wet granulation, also known as pelletisation. The boundary layer forces, which hold the granule particles together, are normally hardened binders, capillary forces, molecular attraction and/or interlocking bonds of a jagged or fibrous surface.

The handling and storage in particular of bulk material can be made easier by agglomeration. In addition, various material properties such as for example flowability can be improved. And for materials in powder form a reduction in dust can be brought about.

Agglomeration of reactive bulk material, such as quicklime or dolomite is particularly advantageous. Quicklime reacts violently with water making its handling and storage difficult. By agglomeration the particle surface area of the lime can be reduced thereby lowering its reactivity and making it easier to handle and store.

Through agglomeration therefore high-grade yet fine-grained lime can be put to efficient use. In addition, by using agglomerated products the development of dust during product use can be reduced since fine-grained fractions can be bound securely and stably in the agglomerate.

To date, however, no technically and economically satisfactory agglomeration methods have been known for reactive bulk material. This is in particular due to the fact that to date there has been no binder available that is suitable for the agglomeration of reactive bulk material.

In industrial processes to date, for the large-scale agglomeration of bulk material, water has been used. Water is not suitable for agglomeration of reactive bulk material, however, since it leads to a chemical reaction and the chemical and physical properties of the bulk material are altered. This makes the bulk material unsuitable for essential applications.

Quicklime, for example, reacts with water to form hydrated lime. The chemical and physical properties of hydrated lime, $Ca(OH)_2$, differ from those of quicklime, CaO, making it unsuitable for various application areas, such for example as steel production, since in the hot molten steel the hydrated lime, $Ca(OH)_2$, with the addition of heat, is split into lime and water. This results in a significant temperature loss of the melt, which becomes unacceptable, inter alia, for further processing in continuous casting and, due to the higher energy expended, in steel production. In addition, considerable amounts of water vapour are released, which can be decomposed into its elements on the hot steel surface. Due to its low hydrogen partial pressure the molten metal absorbs hydrogen, which could lead to serious quality issues in the finished product (in particular hydrogen embrittlement).

Alternatively in engineering organic binders are used for agglomeration methods. Organic binders are unsuitable for agglomeration of reactive bulk material, however, since they have an adverse effect on the further application of the agglomerate. Thus, for example, organic binders can decompose upon contact with lime. The gases given off by organic binders are also harmful to the health of persons coming into contact with the agglomerate.

A further advantage of the granules according to the invention is that even at high temperatures their stability is preserved. For salts have only low volatility. In addition, the use of salts can prevent the reactive bulk material forming undesired mixed phases with the binder thereby losing properties that are important for its respective application.

This is particularly the case for applications in which the agglomerate is heated, such as during steel production. Furthermore, in steel production, the diffusion of cleavage products of the binder in the molten steel can have negative effects on product quality. In addition, when organic binders are used at high temperatures the agglomerate may disintegrate, since the binder is then thermally decomposed.

Finally, it should be pointed out that the majority of organic binders continue to use water as the medium, be this as a suspension or solution, making their use as a binder for reactive bulk material impossible for the above reasons, because a reaction occurs between the reactive bulk material and the water component in the binder.

The object of the invention was to provide granules of the kind mentioned at the beginning, with which the disadvantages of the state of the art can be avoided. To date only hot agglomeration of lime has been successfully investigated in practice, although in so doing high temperatures of up to 900° C. were required. Agglomeration using water as the binder is not possible for lime-based reactive bulk materials if the chemical properties are to be retained. Due to the major advantages of liquid binders, including due to the strong bond-forming effect of capillary forces, agglomeration with other liquids was envisaged.

This object is met according to the invention by granules containing at least one agglomerated reactive bulk material and a binder matrix, wherein the binder matrix contains at least one organic or inorganic salt as the binder.

It has surprisingly been discovered that organic and inorganic salts are exceptionally well-suited as binders for the agglomeration of reactive bulk material. Thus by using organic or inorganic salts as binders the fine-grained fractions of the reactive bulk materials can be bound securely and stably in the binder matrix.

The binders behave quite differently in the finished product. Thus when using anhydrous diboron trioxide ($B_2O_3$) both mixed crystal phases and also pure binder phases may result. When using anhydrous calcium nitrate, $Ca(NO_3)_2$, the particles can be become included in a binder matrix or, with sustained addition of heat, the binder can ultimately be decomposed to solid lime, CaO, with the separation of nitrogen oxides, NOx. In addition, when using calcium nitrate for lime-based bulk materials, there are indications of processes of dissolution and recrystallisation of lime in the molten material that can play a part in the formation of bonds. What all the binders have in common, however, is that the agglomeration can be brought about via a liquid phase of the binder.

In addition, the salt provides the reactive bulk material with excellent atmospheric protection, meaning that the granules have high stability and outstanding handling and storage properties.

A further advantage of the granules according to the invention is their thermal stability. For salts have only a low volatility. In addition, by using salts the reactive bulk material can be prevented from reacting with the binder and thereby losing properties that are important for its application.

According to a particularly preferred embodiment of the invention, the melting point of the binder is lower than the melting point of the reactive bulk material. This has the advantage that the granules can be produced in a simple manner by heating a mixture of bulk material and binder matrix. In this embodiment the reactive bulk material can be distributed extremely homogeneously in the liquid binder matrix and particularly homogeneous and stable granules obtained.

Alternatively the granules can also be created by melting the salt and distributing the molten material in a bulk material bed. Advantages of this technique are the multiple possibilities for applying the molten salt in this approach, for example thermal spraying or atomisation of a molten material on a moved bulk material bed. The bulk material bed can serve for heat insulation from the environment, in particular from machine parts. The energy costs of this approach are particularly favourable. However, the proportion of binder can increase significantly if the bulk material temperature is set too low.

Melting allows the binder to develop its binding effect and, for example by adhesion or capillary forces, to bind with the bulk material. This results in the granules according to the invention. By lowering the temperature after the agglomeration process permanent binding of the bulk material in the solid binder matrix can be brought about.

A further advantage of low-melting salts in the production of the granules according to the invention is their favourable thermodynamic properties. Thus when low-melting salts are used the fuel and energy costs of agglomeration can be kept down. For this reason according to the invention the melting point of the binder is preferably below 600° C., in particular in the range from 100° C. to 600° C.

Binders which, with regard to the application of the agglomerated bulk material, provide added value are particularly suitable. Thus for example a chemical reaction between binder and bulk material during the agglomeration process can provide added value in that the agglomerate has a particular strength and/or chemical properties with particular added value to, or low effect on, the application.

According to the invention it has proven particularly expedient if binders are used which during the agglomeration process form covalent bonds and/or ionic mixed crystals with the reactive bulk material.

As shown in FIG. 1, if for example triboron trioxide, $B_2O_3$, is used the formation of mixed crystal phases is possible. The low-melting mixed phases ($CaO.2B_2O_3$) can make an important contribution to the additional consolidation. Particularly good bonds can also be achieved with ionic liquids.

Ionic liquids contain exclusively ions. Thus liquid salts are involved without the salt being dissolved in a medium such as water. Previously hot molten salts (for sodium chloride over 800° C.) were the only known examples of such liquids. Today ionic liquids are understood to be salts which are liquid at temperatures of below 100° C. Examples of cations used, which can in particular be alkylated, are: imidazolium, pyridinium, pyrrolidinium, guanidinium, uronium, thiouronium, piperidinium, morpholinium, ammonium and phosphonium.

As anions halogenides and more complex ions, such as tetrafluoroborates, trifluoracetates, triflates, hexafluorophosphates, phosphinates and tosylates can be considered. Organic ions, such as for example imides and amides, can also be anions.

The size and symmetry of the ions involved prevents the formation of a strong crystal lattice. Low thermal energy is therefore all that is required to overcome the lattice energy and break open the solid crystal structure. Since the ionic liquids contain no water, the reactive bulk material is not hydrated. By heating the ionic liquid and using it as a liquid binder in the bulk material a capillary force-induced bond is created. Upon cooling and hardening of the ionic liquid it becomes permanently solid. The process operates in the same way for molten salts, but the temperature level is higher. The melting temperature for ionic liquids is considerably below the melting temperature of salts. The use of ionic liquids would thus lead to significant energy savings.

According to the invention, as a reactive bulk material the most varied of bulk materials can be used. Reactive bulk material within the meaning of the invention shall be understood to be a bulk material which undergoes a chemical and/or physical reaction with common agglomeration agents, in particular water and/or organic solvents, in particular molasses or mineral or vegetable oil. Binders exist in particular which are catalytically decomposed by the reactive bulk material, such as for example mineral and vegetable oils.

A particularly suitable bulk material according to the invention is a reactive lime-based material, preferably quicklime, CaO, calcined dolomite, MgO.CaO or calcined magnesite, MgO, or mixtures of these substances, or mixtures with the respective carbonates or other input materials. Quicklime granules are of particular technical value, for example in steel production or the refractory industry, since they have better handling and storage properties than powdered quicklime.

Quicklime is a highly reactive bulk material, which reacts violently with water thereby losing its advantageous properties, for example in steel production. Through the use according to the invention of salt in the agglomeration of quicklime this can be prevented and a stable agglomerate obtained.

If the granules according to the invention are to be used in the steel production process, then it is an advantage if the binder consists of chemical elements which have no or a positive effect on the steel production process.

Therefore, according to the invention, it is preferred if the binder contains one or more of the following elements: sodium, boron, aluminium, iron, fluorine, nitrogen, carbon, oxygen.

Particularly suited according to the invention is the use of one or more of the following salts as binders: calcium nitrate, iron fluoride, sodium fluoride, cryolite, boron trioxide.

Boron trioxide, in particular, due to its low melting temperature of approximately 450° C. and its high resistance to temperature, has particularly advantageous properties. A further advantageous property of boron trioxide as a binder in view of steel production is that it lowers the viscosity of the slag in the desired manner.

The grain size of the bulk material in the granules according to the invention can have wide ranges of variation. Practical tests have shown that granules with particularly good properties are obtained if the bulk material in the granules has an average grain size of 0-100 μm and/or a D50 value of 40 to 60 μm.

The grain size of the granules can also have wide ranges of variation. An appropriate variation in the granule grain size is within the range 1 to 6 mm or above.

The proportion of bulk material in the granules is preferably in the range from 85 to 99%. The greater the proportion of bulk material in the granules, the greater the proportion of active substance in the granules. The higher the proportion of binder, the more reliable is the binding of the bulk material in the binder matrix and the higher the stability of the granules. Practical tests have shown that particularly good results are achieved if the ratio of bulk material to binder varies within the range from 5:1 to 100:1.

The apparent density of the granules varies as a function of the type of bulk material, the type of binder and the respective proportions of the individual components of the granules.

Depending on the bulk material, generally apparent densities in the range from 0.7 to 1.2 have proven to be suitable. If quicklime and/or dolomite is/are used as the bulk material, then in particular in view of the use of the granules in the refractory and steel industry apparent densities in the range from 0.9 to 1.1 have proven to be suitable.

A further object of the invention is a method for producing granules comprising the following steps (process variant A):
  mixing of reactive bulk material, binder and as necessary further auxiliary materials;
  heating the mixture to a temperature of at least the melting temperature of the binder, wherein the binder at least partially melts;
  cooling the mixture with the formation of the granules;
or comprising the following steps (process variant B):
  heating the binder to a temperature of at least the melting temperature of the binder;
  mixing the at least partly melted binder with the reactive bulk material, and if necessary the auxiliary materials;
  cooling the mixture with the formation of the granules.

The advantage of a process according to process variant A, in which first reactive bulk material, binder and if necessary further auxiliary materials are mixed and then heating of the mixture takes place, is that a very homogeneous mixture can be achieved using the minimum amount of binder.

The advantage of process variant B is that energy consumption can be reduced compared with variant A, since the bulk material can have a temperature below the temperature of the binder.

The mixing of reactive bulk material, binder and as necessary further auxiliary materials in process variant A is advantageously performed as follows:
  1. weighing the components of the finished product;
  2. homogenizing the components in a suitable mixing unit, for example an air mixer or horizontal axis or vertical axis bulk material mixer;
  3. heating of the loose mixture in a furnace, for example a chamber furnace, possibly with further agitation. Alternatively the homogenised starting mixture can be briquetted and then heated.

Heating of the mixture to a temperature of at least the melting temperature of the binder in process variant A is advantageously carried out as follows:

The mixture is introduced into a suitable furnace, for example a chamber furnace, in either briquette or loose form. The furnace is brought to the required operating temperature with a suitable fuel or inductively or the temperature is maintained in the furnace during the possibly discontinuous process. After a suitable dwell time the loose finished product is removed from the furnace and cooled and broken or moved while still in the hot state such that agglomerates form, for example using a stirrer. The briquetted mixture can be directly cooled. The use of an indirectly heated rotary furnace is particularly advantageous, in which the loose or briquetted mixture can be continuously added and heated whilst in motion. As a result of the rotation of the furnace agglomerates form which are then cooled.

Heating the binder to a temperature of at least the melting temperature of the binder in process variant B is advantageously carried out as follows: feeding of the binder in a refractory container, for example a graphite crucible or one in high temperature-resistant metal, and then direct heating of the binder in a suitable furnace.

Cooling of the mixture with the formation of the granules in process variant A/B takes place at its simplest naturally.

In the following the invention is described in more detail using an example:

EXAMPLE: PRODUCTION OF GRANULES ACCORDING TO THE INVENTION 1. 62 g of boric acid are dehydrated by heating and melted. Approximately 26 g of boron trioxide are obtained. The boron trioxide is cooled and ground. The powder is mixed with 150 g of fine lime and pressed to form a solid body. The body is heated for one minute to a temperature of at least 700° C. High strength granules are obtained.

2. Approximately 24 g of calcium nitrate tetrahydrate are dehydrated by heating and melted. Approximately 16 g of calcium nitrate are obtained. The molten calcium nitrate is placed on a heated bed of lime and the mixture heated further at approximately 700° C. for two minutes and stirred with a refractory rod. High strength granules are obtained.

What is claimed is:

1. Granules containing at least one agglomerated reactive bulk material and a binder matrix, wherein the binder matrix contains an inorganic salt as the binder, wherein the reactive bulk material is a bulk material that undergoes a violent and immediate chemical reaction when granulated in the presence of water and the proportion of bulk material in the granules is in the range from 85 to 99% and the melting point of the binder is below 600° C. and wherein the apparent density of the granules is in the range from 0.7 to 1.2, and wherein the granules have a grain size of 1 mm or above, wherein the binder contains at least one mineral selected from the group consisting of calcium nitrate and boron trioxide.

2. Granules according to claim 1, wherein the melting point of the binder is lower than the melting point of the reactive bulk material.

3. Granules according to claim 1, wherein the melting point of the binder is in the range from 100° C. to below 600° C.

4. Granules according to claim 1, wherein the bulk material contains a reactive lime-based material.

5. Granules according to claim 4, wherein the lime-based material is selected from the group consisting of quicklime, CaO, calcined dolomite, MgO.CaO, calcined magnesite, MgO, mixtures of these substances, and mixtures of these substances with their respective carbonates.

6. Granules according to claim 1, wherein the binder contains at least one element selected from the group consisting of calcium, boron, nitrogen, and oxygen.

7. Granules according to claim 1, wherein the bulk material has an average grain size of 0 to 100 μm, and/or a D50 value of 40 to 60 μm.

8. Granules according to claim 1, wherein the proportion of binder in the granules is in the range from 1 to 15%.

9. Granules according to claim 1, wherein the granules have a grain size of 1 to 6 mm.

10. Granules consisting of at least one agglomerated reactive bulk material and a binder matrix, wherein the binder matrix contains at least one organic or inorganic salt as the binder, wherein the reactive bulk material is a bulk material that undergoes a violent and immediate chemical reaction when granulated in the presence of water and the proportion of bulk material in the granules is in the range from 85 to 99% and the melting point of the binder is below 600° C. and wherein the apparent density of the granules is in the range from 0.7 to 1.2 and wherein the granules have a grain size of 1 mm or above.

11. Method for the improvement of steel or refractory comprising adding granules, containing at least one agglomerated reactive bulk material and a binder matrix, wherein the binder matrix contains an inorganic salt as the binder, wherein the reactive bulk material is a bulk material that undergoes a violent and immediate chemical reaction when granulated in the presence of water and the proportion of bulk material in the granules is in the range from 85 to 99% and the melting point of the binder is below 600° C. and wherein the apparent density of the granules is in the range from 0.7 to 1.2, and wherein the granules have a grain size of 1 mm or above, wherein the binder contains at least one mineral selected from the group consisting of calcium nitrate and boron trioxide in the manufacture of steel or refractory as input material.

* * * * *